Feb. 9, 1937.  A. NAGEL  2,069,968
FOCUSING SELF ERECTING FRONT CAMERA
Filed March 3, 1936  2 Sheets-Sheet 1

August Nagel, INVENTOR
BY
ATTORNEYS.

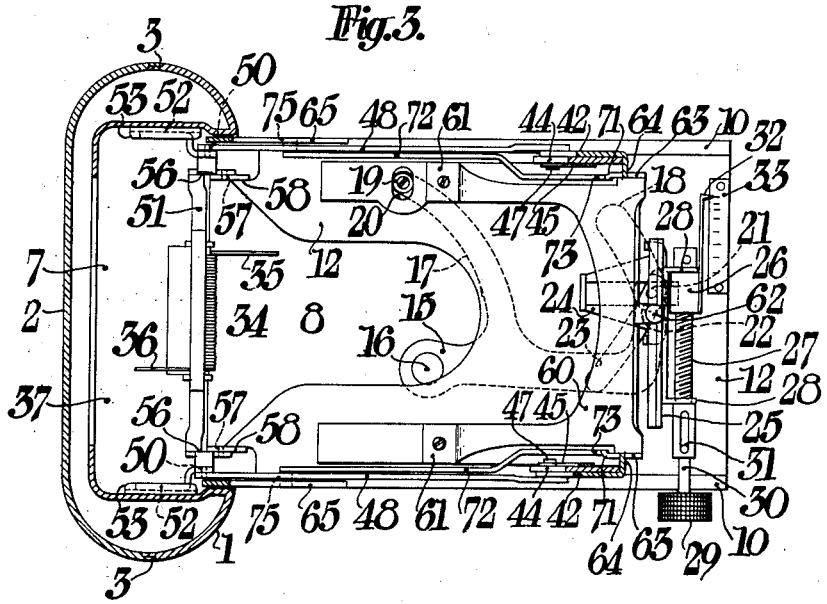
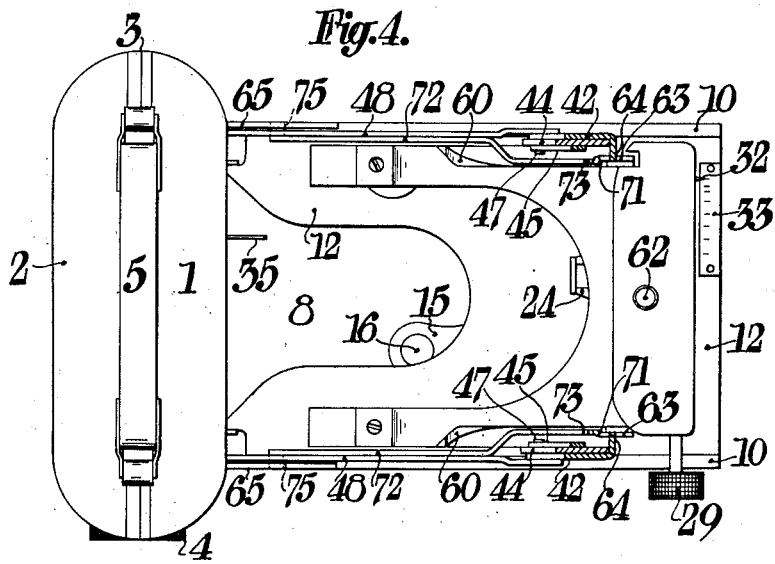

Patented Feb. 9, 1937

2,069,968

UNITED STATES PATENT OFFICE 2,069,968

FOCUSING SELF-ERECTING FRONT CAMERA

August Nagel, Stuttgart, Germany, assignor, by mesne assignments, to Eastman Kodak Company, Jersey City, N. J., a corporation of New Jersey Application March 3, 1936, Serial No. 66,846
In Germany July 19, 1935

7 Claims. (Cl. 95—44)

This invention relates to photography, and more particularly to photographic cameras. One object of my invention is to provide a camera of the type in which focusing can be accomplished and in which a self-erecting front is used, means being provided to prevent the mechanism from being damaged by improperly closing the camera. Another object of my invention is to provide a camera in which the self-erecting front mechanism is mounted to move relative to the camera body on slides mounted on the camera bed and body, and to provide means which will permit the mechanism to be closed only when the slides are in a predetermined position. Another object of my invention is to provide a camera of the class described, utilizing both self-erecting front mechanism and bed braces and being provided with a single lever for operating both sets of mechanism to close the camera. Another object of my invention is to provide a camera mechanism with a two-part bed brace release, one part being mounted to move relative to the other part as focusing is accomplished. Still other objects will appear from the following specification, the novel features being particularly pointed out in the claims at the end thereof.

In cameras employing a self-erecting front mechanism it is usually necessary to provide a slide on which the mechanism is mounted and on which the entire mechanism can be moved as a whole relative to the camera bed for focusing. Such mechanism usually comprises a part mounted on the camera bed and a second part mounted in the camera body. Since the camera bed and the slides carrying the camera mechanism must both be hinged, it is necessary to have these hinges in a predetermined relationship before the camera can be folded, because otherwise either the camera bed or the self-erecting front mechanism may be bent or damaged in attempting to close the camera while it is still focused in such a way that the camera slide and bed hinges will be out of their proper relation for folding.

It is to overcome these objections in a self-erecting front focusing camera that the camera which will now be more fully described was designed. Certain other features of this camera relating particularly to a range finder mounted on a self-erecting front mechanism are shown in my co-pending application for Focusing automatically erecting front camera, Serial No. 66,847, filed March 3, 1936.

Coming now to the drawings wherein like reference characters denote like parts throughout:

Fig. 3 is a part section and part plan view of the camera shown in Fig. 1, the section being taken on line 3—3 of Fig. 1.

Fig. 4 is top plan view of the camera shown in Fig. 1 with parts of the front standard being shown in section so as not to obscure the mechanism carried by the camera bed.

Figure 2:
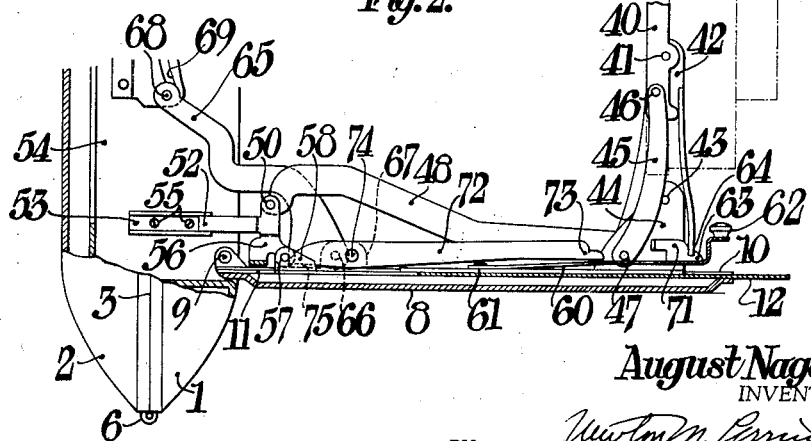
Fig. 2 is a view similar to Fig. 1 but with the parts in a different position.

In accordance with a preferred embodiment of my invention the camera may consist of a body portion 1 having a back 2 which joins the camera body on a line drawn through the center portion of the camera. The camera body may carry the usual winding key 4, handle 5, and the back may be hinged at 6 to the camera body. The camera is of the type having an opening or recess 7 into which the folding parts of the camera may be collapsed when the camera bed 8, hinged at 9 to the camera body, as best shown in Fig. 2, is folded to close the opening 7. The camera bed 8 is provided with a pair of side rails 10 which are grooved at 11 so that a slide 12 may move on the camera bed in the rails 10.

This plate 12 is adapted to move to and from the camera body for focusing a camera objective carried in the shutter, diagrammatically illustrated at 13, one of the lens cells 14 being also indicated.

In order to move the slide 12 for focusing, the mechanism best shown in Fig. 3 may be used. A bell-crank lever 15 is pivotally mounted at 16 on the camera bed 8 and is provided with two arms 17 and 18. Arm 17 may be provided with a stud or roller 19 engaging the walls of a slot 20 of the slide 12. Arm 18 may carry a stud 21 having a slide member 22 pivotally mounted thereon, this slide member being adapted to move in the arcuate slot 23 as the bell-crank lever is moved.

In order to move the slide 22 there is a yoke 24, the arms of which engage the slide, this yoke being mounted to slide upon the rail 25 and being carried by the nut 26 which is moved transversely of the camera bed by means of the screw 27. This screw is carried by a pair of brackets 28 fixedly mounted with the rails 25 on the camera bed, so that while the screw 27 may be turned by the handle 29, it does not slide relative to the bed. The handle 29 may be carried by an extension shaft formed by a shaft 30 having a pin and slot connection 31 with the screw 27, so that the handle can be drawn out or pushed in to save space when the camera is to be folded.

When the handle 29 is turned, the bell-crank lever is swung upon its pivot 16 and through the roller 19 and slot 20, the plate 12 is moved on the camera rails 10 so that mechanism carried by the plate will be moved for focusing the camera. I prefer to provide a pointer 32 which may be carried by the nut 26, this pointer moving over a scale 33 graduated into units of focal distance.

If desired, the camera bed may be automatically opened by means of a spring 34 having one end 35 pressing on the bed and the other end 36 pressing on the bottom wall 37 of the camera body. When the catch which holds the bed closed—38—is operated, the camera bed 8 will open under the pressure of the spring above mentioned.

The self-erecting front mechanism may consist of the structure shown in the first two figures. The camera lens 13 may be carried by a front board 40 pivotally mounted at 41 to a pair of similar uprights 42 which is pivoted at 43 to brackets 44 carried by the slide 12. There are also links 45 pivotally attached at 46 to the front board 40, these being likewise pivoted at 47 to the brackets 44. Because of these uprights and links the movement of the shutter 13 relative to the camera body will be controlled during the opening and closing movements. A pair of levers 48 are attached to pivots 49 on the uprights 42 and at their opposite ends are pivoted at 50 to a slidable member designated broadly as 51, which includes a pair of slides 52 mounted to move in the rails 53 carried by the side walls 54 of the camera and attached thereto in any suitable manner, as by screws 55.

The slide 51 includes a cross bar extending across the camera body as shown in Fig. 3, and includes brackets 56 carrying hinge pintles 57 which hingedly support brackets 58 carried by the slide 12. Thus, when the slide 12 is moved, the entire mechanism above described moves in and out, as all these parts are carried by the slide.

The front braces 42 may be latched in an upright position by means of the spring latch plate 60 attached at 61 to the slide 12 and carrying an operating push-button 62 which may be depressed to release the latch elements 63 from the downwardly projecting elements 64 carried by the uprights 42. When the camera is unfolded, these latch elements automatically engage, and when the camera is to be folded, these latch elements are disengaged by pressing downwardly on the push-button 62.

The self-erecting front mechanism as thus far described is very similar to the structure shown in U. S. Patent 1,974,655, Nagel, September 25, 1934.

When the camera is in a picture-taking position, it must be held in an open or erect position because the levers 48, being slidably mounted on the camera body, cannot perform this function as in the patent above mentioned. Consequently, bed braces of the usual type are provided, these bed braces 65 being pivotally attached at 66 to bracket members 67 extending from the side rails 19 which form a part of the camera bed. The opposite end of the bed braces are provided with studs 68 which are adapted to slide in the track 69 and to engage the hook-like portion of the track 70 in the lower end of the slide when the camera is in an open or operative position.

Figure 1:
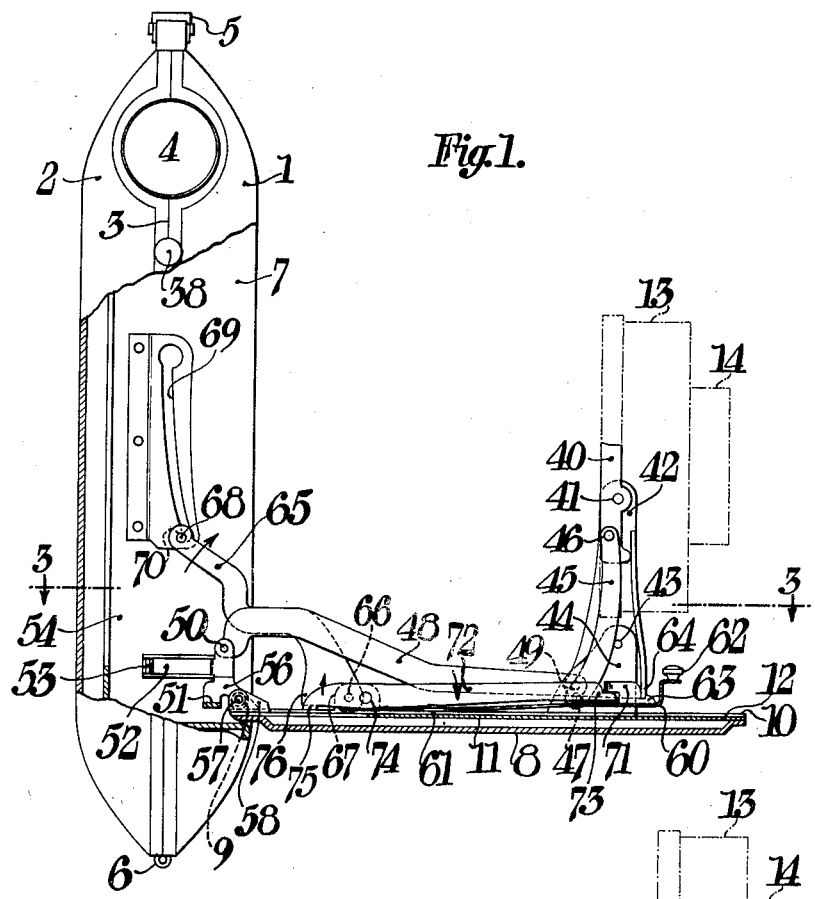
Fig. 1 is a fragmentary side elevation, partially in section, of a camera constructed in accordance with and embodying a preferred form of my invention.

In order to fold the camera these braces must be moved in the direction shown by the arrow in Fig. 1 about the pivot 66. To do this, I provide a bed release consisting of two parts. This bed release is to automatically unlatch the bed braces so that the studs 68 may slide in the rails 69 for closing the camera. One part of the bed release is included on the spring member 60 carrying the push-button 62, this part being shown at 71. Part 71 may comprise a pair of spaced hook-like members carried adjacent to the latch elements 63 and 64 which, forming a part of the spring plate 60, will, of course, be actuated with the plate. In other words, when the push-button 62 is depressed toward the camera bed 8, the hook-like members 71 will also be depressed.

The second part of the bed release consists of a pair of similar lever arms 72 having at their outward ends, hook-like members 73 adapted to engage the members 71 when the parts are in position for folding as shown in Fig. 1. Levers 72 are pivoted to the brackets 67 which pivotally support the bed braces 65 upon separate pivots 74, these brackets, as above explained, are carried by the rails 19 of the bed 8. The arms 72 include flanges 75 which are bent outwardly so as to engage portion 76 of the bed braces which extend rearwardly from the pivot 66.

Each time the push-button 62 is pressed downwardly when the hook-like members 71 and 73 are in engagement, the lever arm 72 will move in the direction shown by the arrow in Fig. 1, thus exerting an upward thrust upon portion 76 of the bed braces, causing them to move in the direction shown by the arrow so that stud 68 will move away from the hook-like portion 70 in the end of slot 69, permitting the camera to fold. However, if the camera has been focused by turning the knob 29 and the slide 12 is in any position other than that shown in Fig. 1, the hook-like members 71 and 73 will be separated as shown in Fig. 2, so that the bed braces cannot be moved to fold. As long as the camera bed remains in a rigid position, the self-erecting front mechanism can not collapse, so that it will be impossible for an operator to close the camera under these conditions.

The cooperating hook-like members 71 and 73 have been so shaped that a comparatively slight relative movement between these two members will render them inoperative to release the bed braces. Thus, it is necessary to have the hinge pintles 9 and 57 in either exact coaxial relationship or so close to such a relationship, before the hook-like members 71 and 73 will release the bed braces, that no damage can be done to the delicate parts of the self-erecting front mechanism by attempting to fold this mechanism unless it is properly positioned for folding, as shown in Fig. 1.

The operation of my improved camera is as follows: To open the camera, it is only necessary to depress the push-button 38, this releasing a known type of latch mechanism and permitting the camera to open under the impulse of spring 34. As the camera bed swings outwardly the linkage erects the lens front 40 and causes the latch elements 64 and 63 to become engaged, thus holding the camera in an erect or picture-taking position. I find it convenient to have this position so arranged that the objective will be focused on infinity, or perhaps on 100 feet.

Should the object to be focused be closer than this position of the camera parts indicated on the scale 33, the focusing knob 29 may be turned to properly adjust the camera for making a picture. If the operator should now attempt to close the camera without restoring it to its initial position by depressing the push-button 62, the hook-like members 71 and 73 will not engage each other, the bed braces will not move to an inoperative position, and the self-erecting front mechanism will be prevented from operating. However, by turning the focusing knob 29 until the pointer 32 moves to its initial position, as shown at Fig. 3, on the scale 33, the knob 62 can be depressed, causing the levers 72 to rock upon their pivots 74 and causing the lug 75 of these levers to thrust upwardly on the bed braces 65, thereby releasing the studs 68 from the hook-like portion 70 of the tracks 69, so that the camera can be closed by merely swinging the bed upwardly.

This mechanism makes it not only safe to close the camera, but it also definitely prevents the camera from being closed if the parts are in position to be damaged by the closing action.

What I claim as my invention and desire to be secured by Letters Patent of the United States is:

1. In a focusing camera, the combination with a camera body including a bed hinged thereto, of braces for holding the bed open, a camera front movably mounted on the bed for focusing to and from a normal position in which the camera may fold, a bed release carried by the camera front and movable therewith, arms mounted on the bed and adapted to be engaged by the bed release and having operative engagement with the bed braces for operating the braces, said bed release engaging said arms only when the camera front lies in a normal position.

2. In a focusing camera, the combination with a camera body including a bed hinged thereto, of braces for holding the bed open, a camera front movably mounted on the bed for focusing to and from a normal position in which the camera may fold, a bed release carried by the camera front and movable therewith, and comprising a pivoted member spring pressed in one direction, arms carried by the bed and including members lying in the path of the pivoted member, operatively engaging the bed braces and adapted to be actuated by the bed release only when the camera front is in a normal position, said members being spaced from the bed release when the latter is moved with the camera front away from the normal position for focusing.

3. In a focusing camera, the combination with a camera body including a bed hinged thereto, of braces for holding the bed open, a camera front movably mounted on the front for focusing to and from a normal position in which the parts may fold, a bed release carried by the camera front and movable therewith and including a pair of hook-like members mounted to move to and from the camera bed near the end of the bed, arms pivotally mounted on the bed having portions contacting with the bed braces and portions projecting into the path of the bed release adapted to be engaged by the hook-like members when the camera front is in a normal position, so that the bed braces may be released by the bed release only when the camera front is in a normal position.

4. In a focusing camera, the combination with a camera body including a bed hinged thereto, of braces for holding the bed open, a camera front movably mounted on the front for focusing and movable to and from a normal position in which the parts may fold, a bed release carried by the camera front and movable therewith and including hook-like members near the end of the bed, arms pivotally mounted on the bed having portions contacting with the bed braces and portions having a cooperative relation with the hook-like members of the bed release when the camera front is in a normal position, said hook-like members and arms having complemental shapes and being adapted to be engaged and disengaged by focusing the camera front to and from its normal position.

5. In a focusing camera, the combination with a camera body including a bed hinged thereto, of braces for holding the bed open, a camera front movably mounted on the front for focusing to and from a normal position in which the parts may fold, a bed release carried by the camera front and movable therewith and including hook-like projections near the end of and at the sides of the camera bed, arms pivotally mounted on sides of the bed having portions contacting with the bed braces and portions adapted to cooperate with the hook-like portions of the bed release, said cooperating portions being positioned and arranged to be moved out of operative relationship through relatively slight focusing movement of the camera front away from its normal position.

6. In a focusing camera, the combination with a camera body, of a bed hingedly attached thereto, braces for holding the bed in an open position, a camera front slidably mounted on the camera bed for focusing and movable to and from a normal position in which the parts may fold, means for causing the front to slide, a bed release comprising two separable parts, one part carried by the slidable front and the other part carried by the camera bed, the part carried by the camera bed engaging the bed braces, said two parts being adapted to separate when said front is moved from its normal position.

7. In a focusing camera, the combination with a camera body, of a bed hingedly attached thereto, braces for holding the bed in an open position, a camera front slidably mounted on the camera bed for focusing to and from a normal position in which the parts may fold, means for causing the front to slide, a bed release comprising two separable parts, one part carried by the slidable front and the other part carried by the camera bed and cooperative faces on the parts having complementary faces shaped to be disengaged by relatively slight movement of the slidable front away from its normal position, said second-mentioned part carried by the camera bed operative engaging said braces.

AUGUST NAGEL.